Dec. 16, 1947.  C. C. S. LE CLAIR  2,432,969
HIGH PRESSURE LUBRICATING APPARATUS
Filed Dec. 8, 1944  2 Sheets-Sheet 1
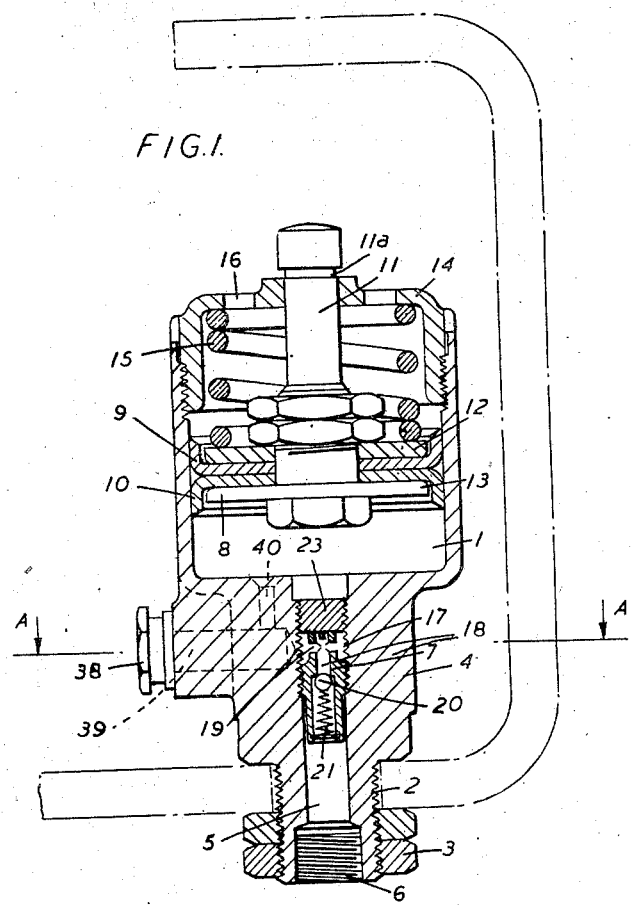
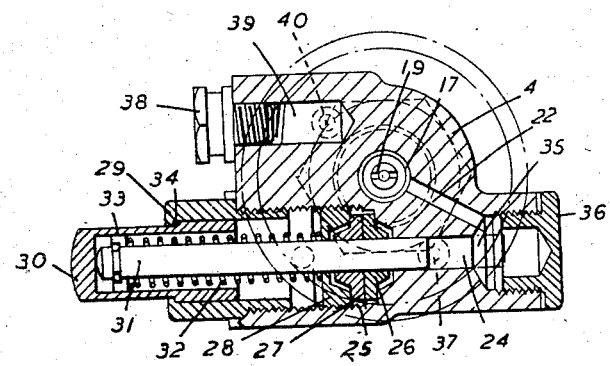
Inventor
Camille Clare Sprankling Le Clair
By
Williams, Bradbury & Henkel
Attorneys

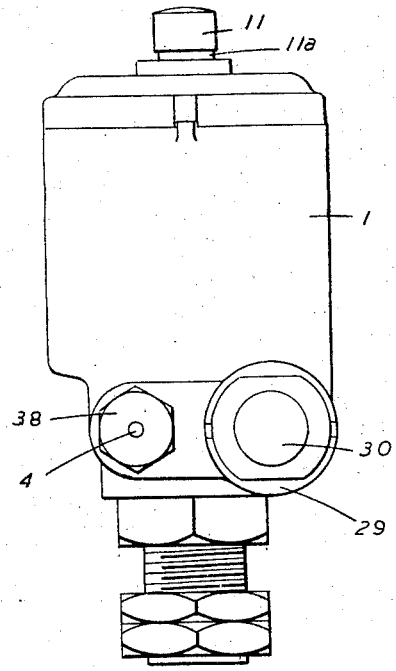
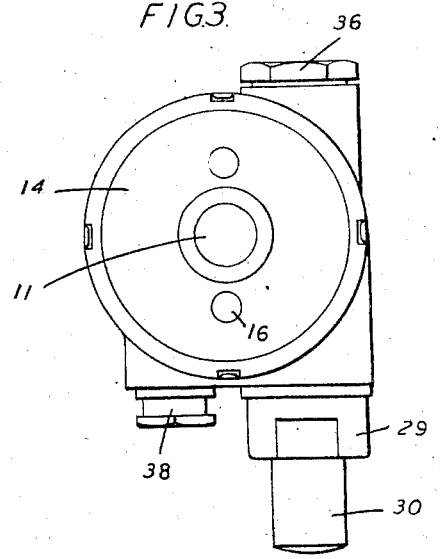

Patented Dec. 16, 1947

2,432,969

UNITED STATES PATENT OFFICE 2,432,969

HIGH-PRESSURE LUBRICATING APPARATUS

Camille Clare Sprankling Le Clair, Acton, London, England

Application December 8, 1944, Serial No. 567,171
In Great Britain November 17, 1943

2 Claims. (Cl. 184—28)

This invention relates to high pressure lubricating apparatus of the type which comprises a spring loaded low pressure piston adapted to force lubricant from a low pressure cylinder into a high pressure cylinder from which the lubricant is forced at higher pressure into at least one bearing or other lubrication point.

A well known method of supplying lubricant to a bearing is to provide the latter with a grease nipple and to force the lubricant through the latter by means of a manually-operated high pressure grease gun having a nozzle which is either adapted to hook on to the nipple or is formed with a partly-spherical sealing surface adapted to form a lubricant-tight seal with the correspondingly-shaped surface of the nipple under the application of manual pressure.

In certain circumstances, however, the use of a manually-operated grease gun may be extremely difficult. For example, the bearings to be lubricated may be situated in a comparatively inaccessible position which can only be reached by a man climbing along a gantry. In these circumstances, the operator needs both hands to hold on by to secure his own safety and this is impossible if one or both hands are occupied with carrying a manually-operated grease gun. Moreover, the attachment of the gun to the nipples is an extremely difficult operation in such circumstances.

One object of the present invention, therefore, is to provide lubricant feeding apparatus which can be operated without the use of a grease gun, and which can be operated by the use of one hand only or even by the body of the operator, in which latter case both hands of the operator would be free.

A further object of the invention is to supply lubricant-feeding apparatus which can be charged with sufficient lubricant to last for a predetermined period, say, for example, thirty or more days, so that the difficult operation of recharging need only be undertaken once a month.

With the above objects in view, according to the present invention, I provide apparatus which comprises a low pressure cylinder adapted to contain a predetermined quantity of lubricant, means for applying pressure constantly to said lubricant, a high pressure cylinder, means connecting the low pressure cylinder to the high pressure cylinder, a high pressure piston in the high pressure cylinder and manually-operable means whereby lubricant fed into the high pressure cylinder by the said means for applying pressure to the lubricant in the low pressure cylinder may be ejected at high pressure from the high pressure cylinder, the said manually-operable means being operable by the use of one hand or of the body of the operator.

In one constructional form of the invention, the apparatus comprises a spring-pressed low pressure or follower piston slidable in the low pressure cylinder, which latter is formed in the body of the apparatus and is connected via an outlet passage, to a high pressure cylinder. The latter is formed with an inlet port which normally communicates with the said outlet passage and which is adapted to be closed when the high pressure piston is thrust inwards by the manual pressure exerted upon it by the operator. The high pressure cylinder is also provided with a valve controlled outlet passage leading to the bearing to be lubricated, through which passage lubricant is forced when the high pressure piston is thrust inwards by the operator.

The said low pressure piston is acted upon by a spring so that the lubricant in the low pressure cylinder is constantly under pressure which, however, is insufficient to open the outlet valve. The piston is preferably mounted upon a piston rod which projects from the apparatus and thus acts as a tell-tale to warn the operator of the quantity of lubricant contained in the low pressure cylinder. The high pressure piston is preferably spring-urged outwardly, its outer end being fitted in a slidable plunger which normally projects well out of the apparatus and can thus readily be found by the operator even in the dark.

In order to charge the low pressure cylinder with lubricant, it is preferred to use a nipple communicating with a passage leading to the low pressure cylinder, whereby the latter can be charged with lubricant from a grease gun.

The apparatus may be used for the feeding of oil or relatively viscous lubricants (generally known as "grease") to one or more bearings. It may be mounted directly upon a bearing or it may be connected to one or more bearings by means of one or more conduits.

Further constructional features of the invention will be described hereinafter.

One constructional form of the invention is shown, by way of example, on the accompanying drawings, whereon:

Fig. 1 is a sectional elevation of the apparatus;
Fig. 2 is a section on the lines A—A in Fig. 1;
Fig. 3 is a plan view of the apparatus; and
Fig. 4 is an outside elevation.

Referring to the drawings:

The apparatus comprises a body which at its upper end is formed with a low pressure cylinder 1 and at its lower end with a shank 2 which is screwed externally so that it may be screwed into a support and, if necessary, receive locknuts 3. A central part 4 of the body connects the shank to the base of the low pressure cylinder, this part being smaller in diameter than the cylinder but greater in diameter than the shank. A lubricant discharge conduit 5, which is for convenience placed coaxial with the low pressure cylinder 1 is drilled from the bottom of the latter to the bottom end of the shank. The lower end of this conduit is counterbored at 6 to a larger diameter and threaded to receive the threaded end of a pipe or pipe union (not shown) for connection to the bearing. The upper end of the discharge conduit, for about half the total length, is also threaded to receive an outlet valve housing 7 which will be described later.

A low pressure piston or follower 8 comprising two back to back cup leathers 9 and 10 mounted on the bottom end of a piston rod 11 between upper and lower backing plates 12 and 13, is slidably arranged in the cylinder 1, the piston rod being of such a length that it always projects upwards through, and is slidable in, a hole formed centrally in a cover 14 screwed into the upper end of the cylinder. A coil spring 15 is arranged between the underside of the top of the cover and the upper backing plate 12, and tends constantly to force the piston 8 downwards in its cylinder. The top of the cover is also formed with a number of holes 16 in order to put the cylinder space above the piston into communication with the atmosphere. The piston rod 11 may also conveniently be provided with a mark (such as a groove filled with coloured paint 11a) which by its relationship with the cover 14, indicates the amount of grease present in the low pressure cylinder.

The aforesaid outlet valve housing 7 is a cylindrical member, which is threaded externally so that it may be screwed into the said upper threaded part of the discharge conduit 5 below the bottom of the cylinder 1. For a short distance down from its top end, the housing 7 is turned down to a smaller diameter so that an annular space 17 is left between this portion and the threaded wall of the discharge conduit. Throughout the whole length of the housing 7 runs a central passage 18. At the upper end, this passage communicates by means of cross ports 19 with the annular space 17 and at a point about halfway down it opens out to a larger diameter, thus providing a shoulder upon which the outlet valve 20 seats. The outlet valve consists of a ball and is held on its seat by a coil spring 21 housed in the enlarged bore and held in place by a circlip.

This housing 7 with its valve 20 is screwed down into the aforesaid threaded portion of the discharge conduit until the annular space comes opposite to and communicates with a cross passage 22, Fig. 2, leading from the high pressure cylinder to be described later.

In this position the housing 7 will be at the bottom of the threaded part of the discharge conduit.

To hold the housing in this position and to stop communication between the annular space 17 (and the high pressure cross passage 22) and the low pressure cylinder 1 a threaded plug 23 is inserted into the discharge conduit and screwed down on top of the outlet valve housing 7.

A cylinder 24 (hereinafter called the "high pressure cylinder") is also formed in the said central part 4 of the body, this cylinder being spaced to one side of the axis of the low pressure cylinder. One end of the high pressure cylinder is counterbored at 25 and is adapted to receive a sealing ring 26 (which may be constructed in the manner described in my co-pending application No. 522,643, now Patent No. 2,402,114), having an external flange 27 which is locked between the inner end of the enlarged bore and a nut 28 which is screwed into the bore. An operating plunger housing 29 is screwed into the outer end of the said enlarged bore and a hollow operating plunger 30 is slidable in the housing. The outer end of a high pressure piston 31 is arranged in the hollow plunger, the piston extending inwards through the plunger, the plunger housing 29, the gland nut 28 and the sealing ring 26 into the high pressure cylinder 24 in which its inner end is slidable. The pressure sensitive edges of the sealing ring form lubricant seals with the high pressure piston 31 and thus prevent leakage of lubricant along the piston into the enlarged bore and thence to atmosphere. The operating plunger 30 and the high pressure piston 31 are both forced outwards by a coil spring 32 which surrounds the piston and bears at its inner end against the gland nut 28 and at its outer end against a retaining washer 33 fitted on the piston. The outer end of the piston is thus forced against the end of the operating plunger 30 and the outward movement of the latter beyond the desired limit is prevented by the abutment of a shoulder 34 on the plunger against an inwardly turning collar on the end of the plunger housing. A predetermined length of the plunger, therefore, normally always protrudes from the plunger housing at the outside of the apparatus.

The inner end of the high pressure cylinder is also enlarged and threaded and into this enlarged bore 35 is screwed the shank of a hollow plug 36, which is shorter than the enlarged bore, so that a chamber is formed between the inner end of the high pressure cylinder, the end of the shank and the end of the recess in the plug. A lubricant inlet port 37, which is normally uncovered by the high pressure piston, is formed in the high pressure cylinder and communicates through a passage with the interior of the low pressure cylinder below the low pressure piston 8. It will be appreciated that the port 37 is not in the bottom of the high pressure cylinder as shown in Fig. 2 but in the top of the cylinder. The cross passage 22 connects the aforesaid chamber 35 with the annular space 17 surrounding the outlet valve housing.

The low pressure cylinder is charged with lubricant by means of a nipple 38 screwed into a passage 39 which is formed in the central part of the body and connected to the interior of said cylinder by means of a port 40 (which again is in the top of the passage 39 not in the bottom as shown in Fig. 2). The lower end of the said central part 4 of the body may be square or hexagonal so as to fit a spanner, whereby the shank of the body may be screwed into a hole formed in a support for the apparatus.

In order to prepare the apparatus for use, the low pressure cylinder 1 may be charged with lubricant by means of a grease gun applied to the nipple 38. As the lubricant is forced into the cylinder, the low pressure piston 8 is pressed upwards against its spring 15, the strength of which may be such that, initially when the piston is right down, the lubricant is loaded to some comparatively small pressure, say of 20 lbs. per square inch, which when the piston rises to the top increases to say 30 lbs. per square inch. This spring pressure is sufficient to force lubricant from the low pressure cylinder 1 through the inlet port 37 in the high pressure cylinder 24 into the latter, into the chamber 35 adjacent to the inner end of the high pressure cylinder through the cross passage 22 into the annular space 17 surrounding the outlet valve housing, through the cross ports 19 connecting this annular space to the centre passage 18 in the outlet valve housing and down as far as the outlet valve 20. Normally, the lubricant cannot pass the outlet valve, because the latter is loaded to some higher pressure which will prevent the valve being raised under the static pressure applied to the lubricant by the low pressure piston. In order to force lubricant into the bearing, the operator applies pressure to the operating plunger 30, whereby the high pressure piston 31 is forced inwards in its cylinder thereby first closing the inlet port and then raising the pressure of the lubricant thus trapped in the high pressure cylinder 24, the chamber 35, the cross passage 22 connecting the annular space 17 to the chamber, the annular space, the cross ports 19 and the centre passage 18 in the outlet valve housing until the outlet valve is forced from its seat and thereafter delivering a quantity of lubricant under pressure into the pipe connecting the apparatus to the bearing. Any return of grease from the annular space 17 back to the low pressure cylinder is prevented by the threaded stop plug 23. The bore of the high pressure cylinder is so chosen that the requisite discharge pressure can be conveniently obtained by the application to the plunger 30 of a force of 20 to 25 lbs. which can be conveniently exerted by the thumb pressure of an ordinary man.

If desired, the exposed end of the operating plunger 30 may be so arranged and constructed that pressure can be applied to it by the body of the operator, in which case the operator can employ both hands to steady himself in conditions such as are met with, for example, when a vessel is sailing in rough seas.

A pivoted lever could also be arranged to apply pressure to the said operating plunger.

It will be appreciated that the apparatus is applicable to many other purposes than that referred to above.

I claim:

1. Lubricating apparatus of the type described, comprising a body member, a low pressure cylinder formed in said body member, a spring pressed low pressure follower piston slidable in said low pressure cylinder, a high pressure cylinder formed in said body member, an inlet port for said high pressure cylinder normally placing said high pressure cylinder in communication with said low pressure cylinder, a manually operable high pressure piston reciprocable in said high pressure cylinder, said high pressure piston being so arranged when in advanced position to close said inlet port and when in retracted position to uncover said inlet port, a discharge conduit formed in said body member leading from said high pressure cylinder and having a portion formed coaxial with said low pressure cylinder, a spring urged non-return valve in said coaxial portion of said discharge conduit, said valve being loaded to greater pressure than that acting upon said low pressure piston so that said valve normally remains closed, said valve comprising a separate housing disposed in said discharge conduit, a plurality of lateral ports in said housing communicating with an annular space between said housing and the wall of said discharge conduit, and means for isolating said annular space from said low pressure cylinder and for positioning said housing in said discharge conduit.

2. The combination set forth in claim 1, wherein said valve housing is removably mounted in said discharge conduit.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 889,306 | Hoffman | June 2, 1908 |
| 1,686,241 | MacIndoe | Oct. 2, 1928 |
| 1,721,817 | Goodman | July 23, 1929 |
| 1,876,343 | Pritchard | Sept. 6, 1932 |
| 1,896,507 | Battle | Feb. 7, 1933 |
| 1,976,903 | Tear | Oct. 16, 1934 |
| 1,989,451 | Hull | Jan. 29, 1935 |